United States Patent [19]

Silvestri

[11] 3,862,186

[45] Jan. 21, 1975

[54] PROCESS FOR THE PRODUCTION OF CEPHALEXIN MONOHYDRATE

[75] Inventor: Herbert Horatius Silvestri, Dewitt, N.Y.

[73] Assignee: Bristol-Myers Co., New York City, N.Y.

[22] Filed: Jan. 22, 1973

[21] Appl. No.: 325,798

Related U.S. Application Data

[63] Continuation-in-part of Ser. No. 315,777, Dec. 15, 1972, abandoned.

[52] U.S. Cl. .............................. 260/243 C, 424/246
[51] Int. Cl. .............................................. C07d 99/24

[58] Field of Search ................................. 260/243 C

[56] References Cited
UNITED STATES PATENTS

| 3,655,656 | 4/1972 | Van Heyningen | 260/243 C |
| 3,692,781 | 9/1972 | Oughton | 260/243 C |
| 3,728,341 | 4/1973 | Crisp et al. | 260/243 C |

*Primary Examiner*—Nicholas S. Rizzo
*Attorney, Agent, or Firm*—Herbert W. Taylor, Jr.

[57] ABSTRACT

The most stable form of crystalline cephalexin monohydrate was prepared by an efficient new process.

9 Claims, No Drawings

PROCESS FOR THE PRODUCTION OF CEPHALEXIN MONOHYDRATE

CROSS-REFERENCE TO RELATED APPLICATION

This application is a continuation-in-part of my prior, copending application Ser. No. 315,777 filed Dec. 15, 1972 and now abandoned.

BACKGROUND OF THE INVENTION

1. Field of the Invention

The compound of the present invention is an antibacterial agent of the class commonly called cephalosporins.

2. Description of the Prior Art

Cephalexin is an antibacterial agent used in human therapy and marketed as the monohydrate of the free acid (i.e., the zwitterion). It is described, for example, in J. Med. Chem. 12, 310-313 (1969), J. Org. Chem. 36(9), 1259-1267 (1971) and J. Org. Chem. 37(17), 2765-2767 (1972) [See Belgium 765,596; Farmdoc 67,511S]and in U.S. Pat. No. 3,507,861, U.K. 1,174,335 and Canada 856,786.

There are numerous disclosures of alternative methods for the production and purification of cephalexin (as the free acid). Examples include U.S. Pat. Nos. 3,634,416; 3,668,201; 3,688,202; 3,671,449 (Example 3); 3,676,434; 3,676,437; 3,689,483; 3,694,437; 3,714,146; U.K. 1,227,014 and Belgium 768,306 (Farmdoc 80093S) and by my colleagues J. Rubinfeld, R. U. Lemieux and R. Raap in U.S. application Ser. No. 143,683 filed May 11, 1971 (corresponding to Germany Off. 2,222,953 and Japan Publ. No. 42795/1972) and U.K. 1,270,633.

Various disclosures with regard to crystalline forms and hydrates of cephalexin are given, for example, by Pfeiffer et al., in Journal of Pharmaceutical Sciences, 59(12), 1809-1814 (1970), by Bond et al. in Pharmaceutical Journal, 210-214 (August 22, 1970), in U.S. patents 3,502,663; 3,531,481; 3,655,656 and 3,692,781, in Belgium 753,910 (Farmdoc 8214S) and Belgium 777,789 (Farmdoc 48556T) and in France 2,096,117.

SUMMARY OF THE INVENTION

This invention provides the process of producing the relatively water-insoluble crystalline form of cephalexin monohydrate exhibiting essentially the following X-ray diffraction data:

| Interplanar Spacing d (A) | Relative Intensities $I/I_1$ |
|---|---|
| 16.01 | .19 |
| 12.07 | 1.00 |
| 10.82 | .13 |
| 9.64 | .03 |
| 8.83 | .07 |
| 8.53 | .13 |
| 8.10 | .26 |
| 7.07 | .08 |
| 6.10 | .14 |
| 5.60 | .22 |
| 5.43 | .64 |
| 4.98 | .17 |
| 4.76 | .09 |
| 4.57 | .17 |
| 4.39 | .18 |
| 4.23 | .18 |
| 4.02 | .30 |
| 3.94 | .13 |
| 3.86 | .19 |
| 3.79 | .04 |
| 3.70 | .05 |
| 3.61 | .18 |
| 3.44 | .08 |
| 3.24 | .10 |
| 3.20 | .05 |
| 3.11 | .13 |
| 2.99 | .08 |
| 2.91 | .09 |
| 2.80 | .07 |
| 2.73 | .07 |
| 2.67 | .09 | which comprises preparing a concentrated, acidic aqueous solution of cephalexin (having a pH less than 2.4 and preferably in the range of 1.7-2.3 or about 2.3), adding sufficient n-butanol to form two liquid phases (and preferably at least 0.5 volumes n-butanol per each volume of aqueous solution and preferably also adding seed crystals of said insoluble form of cephalexin monohydrate) and then slowly neutralizing said biphasic system (preferably at a temperature no higher than 45° C. and preferably in the range of about 20° C. to 25° C.) up to about pH 4.0-5.0 (preferably with triethylamine, sodium hydroxide, potassium hydroxide or ammonium hydroxide) to precipitate said water-insoluble crystalline form of cephalexin monohydrate.

The use of lower temperatures (in the range of 20°-25° C.) is particularly valuable because it reduces the decomposition observed when higher temperatures are used.

The pH values are determined by a glass electrode inserted in the stirred two-phase system during neutralization and in the separated aqueous phase at the end of the titration.

The preferred neutralizing agents are sodium hydroxide, potassium, hydroxide and ammonium hydroxide.

DETAILED DESCRIPTION

The water-insoluble form of cephalexin monohydrate referred to here as an approximate solubility of 10 mg./ml. This was determined in a somewhat crude manner. 30 mg. was suspended in 1.0 ml. of deionized water and shaken for 5 minutes; some solids remained in suspension. Another 1.0 ml. addition of water was made and not all of the solids had gone into solution after 5 minutes of shaking. Another 1.0 addition of water was made (total 3.0 ml. H₂O) and at this point there was obtained a clear solution. The solubility therefore is between 10 and 15 mg. per ml.

The soluble cephalexin monohydrate obtained from the acetonitrile — H₂O crystallization system (which may also be solvated with acetonitrile) is soluble at 30-50 mg./ml. When 30 mg. is added to 1.0 ml. of water, complete solution results. When 50 mg./ml. is made up, almost complete solution results but a long hairy needle type of crystal starts to crystallize out almost immediately. The whole system sets up into a mash that will not pour out of a bottle or test tube. This form is the presumed dihydrate.

Test tube results show that if a slurry of the insoluble monohydrate is made up and the soluble monohydrate is added in small increments, the resulting slurry will form the insoluble monohydrate crystals upon addition of the soluble monohydrate. The long needles mash of dihydrate does not form. This was done at about 25° C. in test tubes.

The present invention provides a specific crystalline form of water-insoluble cepalexin monohydrate and processes for its preparation. The utility of this crystalline form is identical to that of the cephalexin products extensively reported in the previous scientific and medical literature. Thus this crystalline form of cephalexin monohydrate is a useful antibacterial agent in animal therapy, including man, possesses good stability and provides effective blood levels on oral administration. Its precise and reproducible chemical and physical nature makes it highly suitable for efficient commercial production and subsequent formulation.

These examples are given in illustration of, but not in limitation of, the present invention.

DESCRIPTION OF THE PREFERRED EMBODIMENTS

EXAMPLE 1

Cephalexin insoluble monohydrate by addition of soluble cephalexin monohydrate to water at 40° C.

To 25.0 ml. water warmed to 40° C. was added 1.0g. insoluble cephalexin monohydrate form (as seed) with stirring. A total of 15 ml. n-butanol was added at this point. A total of 20 g. of soluble cephalexin monohydrate was added in 0.5 g. increments at two minute intervals with the temperature held at 40° C. Each addition went into solution and then promptly crystallized out as the insoluble monohydrate.

The resulting slurry at 40–43° C. for an additional twenty minutes and the temperature was then allowed to drop to 20° C. and the slurry was stirred for an additional 3½ hours. The precipitated insoluble cephalexin monohydrate was collected by filtration, washed with n-butanol (BuOH) (50 ml.) and then with ice-water (30 ml.) and then with n-butanol (30 ml.) and then with isopropyl alcohol (IPA) (75 ml.), dried in an oven at 50° C. (atmospheric pressure) and found to weigh 18.35 g. Analyses showed K.F. $H_2O$ = 5.0%; IPA = 0.27%; BuOH = 0.68%; Chemical Potency = 879 mcg./mg.; Bio Potency = 848 mcg./mg. versus house standard.

EXAMPLE 2

Cephalexin monohydrate insoluble form by BuOH — $H_2O$ system at 20°–25° C.

25.0 g. soluble cephalexin monohydrate crystallized from aqueous acetonitrile was added slowly to 60 ml. $H_2O$. Then 6 N NCl (9.8 ml.) was added dropwise, giving final pH 1.7. The solution was alightly hazy. There was added 2.5 g. decolorizing charcoal ("Darko KB"). The mixture was stirred 15 minutes and filtered. 20 g. NaOH was dissolved in enough water to make 100 ml. of 20 percent NaOH solution.

The carbon was washed with water to give a final filtrate volume of 110 ml. With stirring at 20°–25° C. there was added 3.5 ml. 20 percent NaOH over about 2 minutes; final pH was 2.3. There was then added to the solution as seed 1.0 g. of insoluble cephalexin monohydrate. Then 50 ml. n—BuOH was added and the mixture was stirred at 23° C. while a total of 8.65 ml. additional 20% NaOH was added to increments (of about 0.5 ml.) over 4½ hours.

The pH was thus maintained at 2.4 or slightly higher with a final pH of 4.5 and the temperature was maintained at 20°–25° C. Analyses gave K.F. $H_2O$ = 3.6%. IPA = 0.089%. BuOH = 0.72%. Chem. Potency = 898 mcg./mg.; Bio Potency - 920 mcg./mg.

The precipitated insoluble cephalexin monohydrate was collected by filtration, washed successively with n—BuOH (50 ml.), water (40 ml.), n-BuOH (50 ml.) and IPA (100 ml.) and then dried 22 hours at 53°–55° C. (atmospheric pressure oven) to yield 20.0 g. of dry, crystalline insoluble cephalexin monohydrate.

EXAMPLE 3

Cephalexin Monohydrate (Insoluble Form) Via Butanol-Water Recrystallization

The following procedure has been found to yield very white product having high purity as well as the desired crystal form. The butanol layer removes residual dimethylaniline (DMA) and colored bodies while the aqueous layer purges water-soluble impurities.

1. 1000 g. of primary-grade cephalexin (soluble form from acetonitrile procedure) is added slowly to 2400 ml. of deionized water containing 40 ml. of 6N HCl. The addition is made slowly over a period of about 15 minutes while maintaining the pH at 1.6 – 1.8 adding 6N HCl. The pH is checked constantly and a total of 390 – 400 ml. of 6N HCl is necessary for complete solution. The temperature is maintained at about 20° C.

2. 100 g. of decolorizing charcoal ("Darco KB") is added to the solution and the slurry is stirred for 30 minutes. The slurry is filtered on a precoated filter.

3. The cake is washed with enough deionized water to bring the filtrate volume to 4.0 liters. Higher volumes will lead to higher loss in the motor liquor.

4. The filtrate is adjusted to pH 2.1 – 2.2 with about 30 – 35 ml. triethylamine (TEA). The pH should be monitored. A slight turbidity may result.

5. 2000 ml. of n-butanol is added to the rich aqueous and the temperature is brought rapidly (maximum of 10 minutes) to 60° C. During the rapid heating up about 100 ml. of TEA is added and the batch is seeded. This will give a good crystal slurry.

6. TEA is added constantly over about a 5 minute period (while holding the temperature at 60° C.) to pH 4.4 – 4.6. The total amount of TEA required will be about 345 – 350* ml. The slurry is held for 5 minutes at 60° C and the temperature is then lowered rapidly (5 min.) to 40° C. and then to 20° C. over a 30-minute period. The slurry is stirred at 15 – 20° C. for 3 hours.

*

As a check on its concentration, an aliquot of 6N NCl should be titrated with TEA beforehand to see how much TEA is required to attain pH 4.5. The HCl should be diluted with 8 volumes of deionized water before tht titration is carried out. In this way over-addition of TEA during the hot crystallization can be prevented. 7. The slurry is filtered on a Buchner funnel and the cake is washed with 2 liters of butanol or until the filtrate wash butanal starts to come through colorless. 8. The cake is then washed with 1500 ml. of deionized water at 0° – 5° C. 9. The cake is washed with 1500 ml. of butanol and these washes and mother liquor are saved and the aqueous phase used for recycle. 10. The cake is finally washed with 2000 ml. of isopropanol. It is then dried at 53° – 55° C. overnight, (about 16 – 24 hours). Yields of 800 – 820 g. of insoluble form cephalexin monohydrate per 1000 g. input were obtained.

EXAMPLE 4

Cephalexin Monohydrate (insoluble form) by Direct Crystallization by Bu—OH—$H_2O$ System on Reaction Mixture (Lab. Prep.)

21.4 g. (0.10 mole) of 7'-desacetoxycephalosporanic acid (7-ADCA) was slurried in 500 ml. of dry methylene chloride ($MeCl_2$) to which 16.7 ml. of 1,1,1,3,3-hexamethyl-disilazane (HMDS) was added and the reaction mixture was refluxed for 20 hours. A clear, yellow-orange solution was obtained. Nitrogen gas purging was used during the reflux period to purge $NH_3$ gas. The reaction was cooled to 10° C. and 10.0 ml. of dimethylaniline hydrochloride (DMA·HCl) in $MeCl_2$ (30% w/v) was added followed by 13.4 ml. of dimethylaniline (DMA). The reaction was chilled to 0° C. and blanketed with dry $N_2$. 22.6 g. of D—(-)-phenylglycyl chloride hydrochloride was added in 10 increments over a period of about one hour. The temperature during the addition was held at 0°-2° C. The reaction was held at about 3° C. for 1 more hour. The reaction was then allowed to rise slowly over a period of four hours to 20° C. During this time the slurry of D-(-)-phenylglycine chloride hydrochloride reacted and a slight turbidity was noted. The reaction was held at 20° C. for 1½ hours and a complete solution was obtained. TLC (thin layer chromatography) on a sample of the reaction mixture at this time showed the major cephalexin zone and did not show any unreacted 7-ADCA. The reaction was placed in a refrigerator and held overnight for work-up the next day.

The reaction was stirred and 25 ml. of dry methanol was added. The reaction was stirred and brought to 20°-25° C. and held for 20 minutes. 500 ml. of deionized water was added to the reaction and the two phases were stirred for 15 minutes. The pH was 1.3. The pH was adjusted to 2.3 with 17.0 ml. of TEA. A small amount of brown solids was noted at the interface; they were removed in the next step, dried, found to weigh 0.62 g. and were discarded. The reaction mixture was polish filtered through a "Dicalite" diatomaceous earth precoat with a filter paper on top and the cake was washed with 100 ml. of $MeCl_2$ and then 100 ml. of deionized water for a complete transfer. The aqueous phase was separated and was stirred with 500 ml. of new $MeCl_2$ and then separated. This aqueous phase was stirred and 4.0 g. of "Darco KB" decolorizing charcoal was added and the slurry was stirred for 15 min. The pH of the slurry was 1.9. The slurry was filtered through a "Dicalite" precoat and the cake was washed with 100 ml. of deionized water. The filtrate and wash was concentrated under vacuum to about 150 ml. volume. pH = 1.9. 200 ml. of n-butanol (BuOH) was added to the aqueous concentrate and the two phases were stirred while 4.0 ml. of triethylamine (TEA) was added and 1.0 g. of seed cephalexin monohydrate (insoluble form) was added to the crystallization mix. The temperature was 23° C. The pH was adjusted slowly over a period of 2½ hours to pH 4.6 with TEA. The total amount of TEA used was 35.5 ml. The resulting slurry was stirred for 2 hours at 20°-23° C. and filtered. The cake was washed with 200 ml. of wet n-butanol followed by 100 ml. of cold (0°-5° C.) deionized water. The cake was then washed with 150 ml. of n-butanol followed by a wash of 200 ml. of isopropanol (IPA). The cake was dried at 55°-60° C. and 28.2 g. of cephalexin monohydrate was obtained. The yield was 27.2 g. cephalexin monohydrate (insoluble form; yield corrected for 1.0 g. seed crystals added). The water content was a bit low because the drying temperature should not have exceeded 50° C. The product (30 mgm.) did not dissolve in 1 ml. $H_2O$ but did dissolve completely in 3 ml. $H_2O$.

K.F. $H_2O$ = 2.8%
BuOH = 0.75%
IPA = 0.11%
Chem. Potency = 952 mcg./mg.
Bio Potency = 947 mcg./mg.

RECRYSTALLIZATION

To 40.0 ml. of deionized water 20.0 g. of the above cephalexin monohydrate (insoluble form) was added in increments while 6 N HCl was added continuously. Total 6 N HCl = 8.3 ml. pH = 1.7. A clear yellow solution was obtained. 2.0 g. of "Darco KB" charcoal was added to the solution and the slurry was stirred for 15 min. at 20°-23° C. The slurry was filtered and a complete transfer was obtained with 20 ml. of water wash. The volume of filtrate was 80-85 ml. 70 ml. of n-butanol was added to the aqueous filtrate and 1.0 g. of cephalexin monohydrate (insoluble form) seed was added. The slurry was stirred and small additions of triethylamine (TEA) were made over a period of 3 hr. to a final pH of 4.5. Total TEA = 7.2 ml. The resulting crystal slurry was stirred for 1½ hours and then filtered on a Buchner. The cake was washed with 100 ml. of wet butanol and then 60 ml. of cold deionized water, followed by 100 ml. of butanol and then 100 ml. of isopropanol. Yield of cephalexin monohydrate (insoluble form) = 18.7 g. (-1.0 Seed) = 17.7 g. Dried at 50° C. (1 atm). K.F. = 4.4% $H_2O$, Chem. Potency = 972 mcg./mg.

EXAMPLE 5

Cephalexin Monohydrate (insoluble form) by Direct Crystallization by BuOH—$H_2O$ System From Pilot Plant Rich Aqueous 2000 ml. of Pilot plant partly concentrated aqueous acidic solution of cephalexin was concentrated under vacuum to about 350 ml. The pH of the concentrate was 1.1. Temperature = 22° C. The pH was adjusted to 2.1 with 19.0 ml. of TEA. The solution was seeded with 1.0 g. of cephalexin monohydrate (insoluble form) and 250 ml. of n-butanol was added. A heavy crystal mass formed very readily. The slurry was stirred and TEA (16.0 ml.) was added dropwise in small increments of about 1.0 ml. over a period of 3 hours to pH 4.5. Then the slurry was rapidly heated to 60° C., held for 5 minutes and cooled to 20° C. over 20 minutes. The slurry was stirred for 1 hour at 20°C. and then the solid product was collected by filtration and the filter cake was washed with 400 ml. of wet butanol, followed by 200 ml. of cold (0°-5° C.) deionized water. The cake was then washed with 200 ml. of dry butanol followed by 300 ml. of isopropanol. The cake was dried at 55°-60° C. which was higher than the intended maximum of 50° C. A yield of 60.0 g. of cephalexin monohydrate (insoluble form) was obtained which was 59.0 g. cephalexin monohydrate corrected for seed addition of 1.0 g.

ASSAYS:
K.F. $H_2O$ = 2.9%
IPA = 0.15%
BuOH = 0.67%
Chem. Potency = 890 mcg./mg.

Thirty mgm. of this product dissolved completely in 3 ml. water but not in 1 ml. water.

A sample of the form of cephalexin monohydrate of the present invention (herein called "insoluble" or "water-insoluble") exhibited essentially the following X-ray diffraction data:

| Interplanar Spacing d (A) | Relative Intensities I/I$_1$ |
| --- | --- |
| 16.01 | .19 |
| 12.07 | 1.00 |
| 10.82 | .13 |
| 9.64 | .03 |
| 8.83 | .07 |
| 8.53 | .13 |
| 8.10 | .26 |
| 7.07 | .08 |
| 6.10 | .14 |
| 5.60 | .22 |
| 5.43 | .64 |
| 4.98 | .17 |
| 4.76 | .09 |
| 4.57 | .17 |
| 4.39 | .18 |
| 4.23 | .18 |
| 4.02 | .30 |
| 3.94 | .13 |
| 3.86 | .19 |
| 3.79 | .04 |
| 3.70 | .05 |
| 3.61 | .18 |
| 3.44 | .08 |
| 3.24 | .10 |
| 3.20 | .05 |
| 3.11 | .13 |
| 2.99 | .08 |
| 2.91 | .09 |
| 2.80 | .07 |
| 2.73 | .07 |
| 2.67 | .09 |

The insoluble form of cephalexin monohydrate of the present invention was found by comparison of X-ray diffraction data to be identical with Glaxo's β-form (on the basis of the data given in U.S. Pat. No. 3,692,781) and identical with the form described by Lilly in U.S. Pat. No. 3,655,656 and identical with a commercial sample of Lilly's "KEFLEX" (on the basis of an actual determination of its X-ray diffraction data).

I claim:

1. The process of producing the relatively water-insoluble crystalline form of cephalexin monohydrate exhibiting essentially the following X-ray diffraction data:

| Interplanar Spacing d (A) | Relative Intensities I/I$_1$ |
| --- | --- |
| 16.01 | .19 |
| 12.07 | 1.00 |
| 10.82 | .13 |
| 9.64 | .03 |
| 8.83 | .07 |
| 8.53 | .13 |
| 8.10 | .26 |
| 7.07 | .08 |
| 6.10 | .14 |
| 5.60 | .22 |
| 5.43 | .64 |
| 4.98 | .17 |
| 4.76 | .09 |
| 4.57 | .17 |
| 4.39 | .18 |
| 4.23 | .18 |
| 4.02 | .30 |
| 3.94 | .13 |
| 3.86 | .19 |
| 3.79 | .04 |
| 3.70 | .05 |
| 3.61 | .18 |
| 3.44 | .08 |
| 3.24 | .10 |
| 3.20 | .05 |

-Continued

| Interplanar Spacing d (A) | Relative Intensities I/I$_1$ |
| --- | --- |
| 3.11 | .13 |
| 2.99 | .08 |
| 2.91 | .09 |
| 2.80 | .07 |
| 2.73 | .07 |
| 2.67 | .09 | which comprises preparing a concentrated, acidic aqueous solution of cephalexin, adding sufficient n-butanol to form two liquid phases and then slowly neutralizing said biphasic system to precipitate said water-insoluble crystalline form of cephalexin monohydrate.

2. The process of claim 1 for producing the relatively water-insoluble crystalline form of cephalexin monohydrate which comprises preparing a concentrated, acidic aqueous solution of cephalexin having a pH less than 2.4, adding sufficient n-butanol to form two liquid phases and also adding seed crystals to said insoluble form of cephalexin monohydrate and then slowly neutralizing said biphasic system up to about pH 4.0 – 5.0 to precipitate said water-insoluble crystalline form of cephalexin monohydrate.

3. The process of claim 1 for producing the relatively water-insoluble crystalline form of cephalexin monohydrate which comprises preparing a concentrated, acidic aqueous solution of cephalexin having a pH less than 2.4, adding sufficient n-butanol to form two liquid phases and preferably at least 0.5 volumes n-butanol per each volume of aqueous solution and also adding seed cyrstals of said insoluble form of cephalexin monohydrate and then slowly neutralizing said biphasic system up to about pH 4.5 with triethylamine, sodium hydroxide, potassium hydroxide or ammonium hydroxide to precipitate said water-insoluble crystalline form of cephalexin monohydrate.

4. The process of claim 3 in which the neutralizing agent is sodium hydroxide, potassium hydroxide or ammonium hydroxide.

5. The process of claim 1 for producing the relatively water-insoluble crystalline form of cephalexin monohydrate which comprises preparing a concentrated, acidic aqueous solution of cephalexin, adding sufficient n-butanol to form two liquid phases and then slowly neutralizing said biphasic system at a temperature no higher than 45° C. to precipitate said water-insoluble crystalline form of cephalexin monohydrate.

6. The process of claim 1 for producing the relatively water-insoluble crystalline form of cephalexin monohydrate which comprises preparing a concentrated, acidic aqueous solution of cephalexin having a pH less than 2.4, adding sufficient n-butanol to form two liquid phases and also adding seed crystals of said insoluble form of cephalexin monohydrate and then slowly neutralizing said biphasic system up to about pH 4.0 – 5.0 at a temperature in the range of about 20° C. to 25° C. to precipitate said water-insoluble crystalline form of cephalexin monohydrate.

7. The process of claim 1 for producing the relatively water-insoluble crystalline form of cephalexin monohydrate which comprises preparing a concentrated, acidic aqueous solution of cephalexin having a pH less than 2.4, adding sufficient n-butanol to form two liquid phases and at least 0.5 volumes n-butanol per each volume of aqueous solution and also adding seed crystals of said insoluble form of cephalexin monohydrate and then slowly neutralizing said biphasic system up to about pH 4.0 – 5.0 with triethylamine, sodium hydroxide, potassium hydroxide or ammonium hydroxide at a temperature in the range of about 20° C. to 25° C. to precipitate said water-insoluble crystalline form of cephalexin monohydrate.

8. The process of claim 1 for producing the relatively water-insoluble crystalline form of cephalexin monohydrate which comprises preparing a concentrated, acidic aqueous solution of cephalexin having a pH less than 2.4, adding sufficient n-butanol to form two liquid phases and preferably at least 0.5 volumes n-butanol per each volume of aqueous solution and also adding seed crystals of said insoluble form of cephalexin monohydrate and then slowly neutralizing said biphasic system up to about pH 4.0 – 5.0 with sodium hydroxide, potassium hydroxide or ammonium hydroxide in the range of about 20° C. to 25° C. to precipitate said water-insoluble crystalline form of cephalexin monohydrate.

9. The process of claim 8 in which the neutralizing agent is sodium hydroxide.

* * * * *